United States Patent
Wang et al.

(10) Patent No.: US 10,143,007 B2
(45) Date of Patent: *Nov. 27, 2018

(54) METHOD AND APPARATUS FOR SIGNALING THE RELEASE OF A PERSISTENT RESOURCE

(71) Applicant: INTERDIGITAL PATENT HOLDINGS, INC., Wilmington, DE (US)

(72) Inventors: Jin Wang, Princeton, NJ (US); Guodong Zhang, Syosset, NY (US); Stephen E. Terry, Northport, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/816,337

(22) Filed: Nov. 17, 2017

(65) Prior Publication Data

US 2018/0098347 A1    Apr. 5, 2018

Related U.S. Application Data

(63) Continuation of application No. 15/164,947, filed on May 26, 2016, now Pat. No. 9,848,439, which is a
(Continued)

(51) Int. Cl.
*H04W 72/12* (2009.01)
*H04W 52/04* (2009.01)
(Continued)

(52) U.S. Cl.
CPC ........... *H04W 72/1289* (2013.01); *H04L 1/00* (2013.01); *H04L 1/1812* (2013.01);
(Continued)

(58) Field of Classification Search
None
See application file for complete search history.

(56) References Cited

U.S. PATENT DOCUMENTS 8,175,020 B2   5/2012  Beaudoin et al.
8,175,050 B2   5/2012  Meylan
(Continued)

FOREIGN PATENT DOCUMENTS

CN   1728667 A   2/2006
EP   1890422 A2  2/2008
(Continued)

OTHER PUBLICATIONS

3rd Generation Partnership Project (3GPP), R1-072922, "Voice Over IP Resource Allocation Benefiting from Interference Coordination", Alcatel-Lucent, 3GPP TSG RAN WG1 #49bis Meeting, Orlando, USA, Jun. 25-29, 2007, 9 pages.
(Continued)

*Primary Examiner* — Ayaz R Sheikh
*Assistant Examiner* — Tarell A Hampton
(74) *Attorney, Agent, or Firm* — Condo Roccia Koptiw LLP

(57) ABSTRACT

A method and apparatus for signaling the release of a persistent resource in long term evolution (LTE) are disclosed. An indication of the release of a downlink (DL) persistent resource is received by a wireless transmit receive unit (WTRU) from an evolved Node-B (eNB) via a physical downlink control channel (PDCCH). A positive acknowledgement (ACK) is transmitted by the WTRU which denotes that the indication has been received. The PDCCH or a medium access control (MAC) CE may be used by the eNB to signal the indication. At least one bit may be added to contents of the PDCCH to signal whether the PDCCH is for DL persistent or dynamic resource allocation. The DL
(Continued)

persistent resource is then released and an indication that the DL persistent resource has been released is transmitted.

14 Claims, 1 Drawing Sheet

Related U.S. Application Data continuation of application No. 14/685,159, filed on Apr. 13, 2015, now Pat. No. 9,379,871, which is a continuation of application No. 14/266,349, filed on Apr. 30, 2014, now Pat. No. 9,031,030, which is a continuation of application No. 13/410,988, filed on Mar. 2, 2012, now Pat. No. 8,767,654, which is a continuation of application No. 12/405,573, filed on Mar. 17, 2009, now Pat. No. 8,155,067.

(60) Provisional application No. 61/038,921, filed on Mar. 24, 2008.

(51) Int. Cl.
| | | |
|---|---|---|
| *H04W 72/04* | (2009.01) | |
| *H04L 1/18* | (2006.01) | |
| *H04L 5/00* | (2006.01) | |
| *H04L 1/00* | (2006.01) | |
| *H04W 76/30* | (2018.01) | |
| *H04W 76/27* | (2018.01) | |
| *H04L 1/08* | (2006.01) | |

(52) U.S. Cl.
CPC .......... *H04L 1/1838* (2013.01); *H04L 1/1854* (2013.01); *H04L 5/0053* (2013.01); *H04L 5/0055* (2013.01); *H04W 52/04* (2013.01); *H04W 72/042* (2013.01); *H04W 72/0406* (2013.01); *H04W 72/0413* (2013.01); *H04W 72/1205* (2013.01); *H04W 76/27* (2018.02); *H04W 76/30* (2018.02); *H04L 1/08* (2013.01)

(56) References Cited

U.S. PATENT DOCUMENTS

| | | |
|---|---|---|
| 2002/0168994 A1 | 11/2002 | Terry et al. |
| 2006/0221896 A1 | 10/2006 | Vaittinen et al. |
| 2006/0262795 A1 | 11/2006 | Mamillapalli et al. |
| 2008/0181159 A1 | 7/2008 | Metzler et al. |
| 2008/0192674 A1 | 8/2008 | Wang et al. |
| 2008/0225822 A1 | 9/2008 | Zhang et al. |
| 2009/0103500 A1 | 4/2009 | Malkamaki et al. |
| 2009/0154417 A1 | 6/2009 | Wu et al. |
| 2010/0091728 A1 | 4/2010 | Kim et al. |
| 2010/0238875 A1* | 9/2010 | Sung ...................... H04L 12/66 370/329 |

FOREIGN PATENT DOCUMENTS

| | | |
|---|---|---|
| JP | 2008-535353 A | 8/2008 |
| WO | WO 1999/044182 A1 | 9/1999 |
| WO | WO 2002/007345 A1 | 1/2002 |
| WO | WO 2006/106409 A1 | 10/2006 |
| WO | WO 2008/024321 A2 | 2/2008 |
| WO | WO 2008/024890 A2 | 2/2008 |

OTHER PUBLICATIONS

3rd Generation Partnership Project (3GPP), R1-073257, "PDCCH Format for Transmission of TPC Commands", Qualcomm Europe, 3GPP TSG-RAN WG1 #50, Athens, Greece, Aug. 20-24, 2007, pp. 1-2.

3rd Generation Partnership Project (3GPP), R1-074470, "Uplink Power Control for E-UTRA—Comments on Open Issues (Update of R1-074378)", Ericsson, 3GPP TSG-RAN WG1 #50bis, Shanghai, China, Oct. 8-12, 2007, 10 pages.

3rd Generation Partnership Project (3GPP), R1-090198, "Correction of Semi-Persistent Scheduled Data Transmission De-Activation", LGE, 3GPP TSG-RAN1 Meeting #55bis, Ljubljana, Slovenia, Jan. 12-16, 2008, 3 pages.

3rd Generation Partnership Project (3GPP), R2-080018, "Persistent Scheduling for DL", Nokia Corporation, Nokia Siemens Networks, 3GPP TSG-RAN WG2 Meeting #60bis, Sevilla, Spain, Jan. 14-18, 2008, 5 pages.

3rd Generation Partnership Project (3GPP), R2-080069, "VoIP Establishment Procedure", Panasonic, 3GPP TSG RAN WG2 #60bis, Seville, Spain, Jan. 14-18, 2008, 5 pages.

3rd Generation Partnership Project (3GPP), R2-080329, "Semi-Persistent Scheduling Allocation", Qualcomm Europe, 3GPP TSG-RAN WG2 #60-bis, Seville, Spain, Jan. 14-18, 2008, pp. 1-2.

3rd Generation Partnership Project (3GPP), R2-080683, "Persistent Scheduling for DL", Nokia Corporation, 3GPP TSG-RAN WG2 Meeting #61, Sorrento, Italy, Feb. 11-15, 2008, 6 pages.

3rd Generation Partnership Project (3GPP), R2-080684, "Persistent Scheduling for UL", Nokia Corporation, 3GPP TSG-RAN WG2 Meeting #61, Sorrento, Italy, Feb. 11-15, 2008, 4 pages.

3rd Generation Partnership Project (3GPP), R2-080810, "Explicit Resource Release for Semi-Persistent Scheduling", Research in Motion Ltd., 3GPP TSG-RAN-WG2 Meeting #61, Sorrento, Italy, Feb. 11-15, 2008, 2 pages.

3rd Generation Partnership Project (3GPP), R2-080853, "UL Persistent Resource Release", Huawei, 3GPP TSG RAN WG2 #61, Feb. 11-15, 2008, 2 pages.

3rd Generation Partnership Project (3GPP), R2-081072, "Allocation of Semi-Persistent Resources", Qualcomm Europe, 3GPP TSG-RAN WG 2 meeting #61, Feb. 11-15, 2008, pp. 1-2.

3rd Generation Partnership Project (3GPP), R2-081074, "Release of Semi-Persistent Resources", Qualcomm Europe, 3GPP TSG-RAN WG 2 Meeting #61, Sorrento, Italy, Feb. 11-15, 2008, pp. 1-2.

3$^{rd}$ Generation Partnership Project (3GPP), R2-081158, "UL Semi-Persistent Resource Release", NTT DoCoMo, Inc., 3GPP TSG RAN WG2 #61, Sorrento, Italy, Feb. 11-15, 2008, 2 pages.

3rd Generation Partnership Project (3GPP), R2-081176, "Downlink Multiplexing for Persistent and Dynamic Scheduling", NEC, 3GPP TSG-RAN WG2#61, Sorrento, Italy, Feb. 11-15, 2008, 4 pages.

3rd Generation Partnership Project (3GPP), R2-081575, "Configuration for Semi-Persistent Scheduling", Panasonic, 3GPP TSG RAN WG2 #61bis, Shenzhen, China, Mar. 31-Apr. 4, 2008, 4 pages.

3rd Generation Partnership Project (3GPP), R2-081661, "UL Persistent Resource Release", Huawei, 3GPP TSG RAN WG2 #61bis, Shenzhen, China, Mar. 31-Apr. 4, 2008, 3 pages.

3rd Generation Partnership Project (3GPP), R2-082215, "HARQ Process ID of DL Persistent Scheduling", Huawei, 3GPP TSG-RAN WG2 #62, Kansas City, USA, May 5-9, 2008, 3 pages.

3rd Generation Partnership Project (3GPP), R2-085071, "Missing Details of Semi-Persistent Scheduling for DL", Nokia Corporation, Nokia Siemens Networks, 3GPP TSG-RAN WG2 Meeting #63bis, Prague, Czech Republic, Sep. 29-Oct. 3, 2008, 6 pages.

3rd Generation Partnership Project (3GPP), Tdoc R2-080762, "Synchronized RRC Re-Configuration", Ericsson, TSG-RAN WG2 #61, Sorrento, Italy, Feb. 11-15, 2008, pp. 1-5.

3rd Generation Partnership Project (3GPP), Tdoc R2-080765, "Control of Semi Persistent Scheduling", Ericsson, Samsung, TSG-RAN WG2 Meeting #61, Sorrento, Italy, Feb. 11-15, 2008, pp. 1-2.

3rd Generation Partnership Project (3GPP), Tdoc R2-080829, "Issues on VoIP Support", Samsung, 3GPP TSG-RAN2 Meeting #61, Sorrento, Italy, Feb. 11-15, 2008, 2 pages.

3rd Generation Partnership Project (3GPP), TR 25.814 V1.2.0, "Technical Specification Group Radio Access Network, Physical Layer Aspects for Evolved UTRA (Release 7)", Feb. 2006, pp. 1-84.

3rd Generation Partnership Project (3GPP), TR 25.814 V7.1.0, "Technical Specification Group Radio Access Network, Physical Layer Aspects for Evolved Universal Terrestrial Radio Access (UTRA) (Release 7)", Sep. 2006, pp. 1-132.

(56) References Cited

OTHER PUBLICATIONS

3rd Generation Partnership Project (3GPP), TS 25.211 V3.5.0, "Technical Specification Group Radio Access Network, Physical Channels and Mapping of Transport Channels onto Physical Channels (FDD) (Release 1999)", Dec. 2000, pp. 1-45.

3rd Generation Partnership Project (3GPP), TS 25.211 V9.2.0, "Technical Specification Group Radio Access Network, Physical Channels and Mapping of Transport Channels Onto Physical Channels (FDD) (Release 9)", Sep. 2010, pp. 1-58.

3rd Generation Partnership Project (3GPP), TS 25.321 V2.0.0, "Technical Specification Group (TSG) RAN, Working Group 2 (WG2), MAC Protocol Specification", Apr. 1999, pp. 1-39.

3rd Generation Partnership Project (3GPP), TS 25.321 V3.17.0, "Technical Specification Group Radio Access Network, Medium Access Control (MAC) Protocol Specification (Release 1999)", Jun. 2004, pp. 1-41.

3rd Generation Partnership Project (3GPP), TS 36.212 V8.2.0, "Technical Specification Group Radio Access Network, Evolved Universal Terrestrial Radio Access (E-UTRA), Multiplexing and Channel Coding (Release 8)", Mar. 2008, pp. 1-38.

3rd Generation Partnership Project (3GPP), TS 36.213 V8.2.0, "Technical Specification Group Radio Access Network, Evolved Universal Terrestrial Radio Access (E-UTRA), Physical Layer Procedures (Release 8)", Mar. 2008, pp. 1-30.

3rd Generation Partnership Project (3GPP), TS 36.300 V8.4.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 8)", Mar. 2008, pp. 1-126.

3rd Generation Partnership Project (3GPP), TS 36.321 V8.1.0, "Technical Specification Group Radio Access Network, Evolved Universal Terrestrial Radio Access (E-UTRA) Medium Access Control (MAC) Protocol Specification (Release 8)", Mar. 2008, pp. 1-30.

3rd Generation Partnership Project (3GPP), TS 36.321 V8.10.0, "Technical Specification Group Radio Access Network, Evolved Universal Terrestrial Radio Access (E-UTRA), Medium Access Control (MAC) Protocol Specification (Release 8)", Sep. 2011, pp. 1-47.

3rd Generation Partnership Project (3GPP), TS 36.331 V8.1.0, "Technical Specification Group Radio Access Network, Evolved Universal Terrestrial Radio Access (E-UTRA) Radio Resource Control (RRC), Protocol Specification (Release 8)", Mar. 2008, pp. 1-122.

3rd Generation Partnership Project (3GPP); R1-090024, "PDCCH Validation for Semi-Persistent Scheduling Release", RIM, and RAN1, 3GPP TSG-RAN Meeting #55bis, Ljubljana, Slovenia, Jan. 12-16, 2009, 4 pages.

3rd Generation Partnership Project (3GPP), R2-081453, "RAN2 Impacts of Half-Duplex FDD operation in LTE", Ericsson, TSG-RAN WG2 Meeting #61bis, Shenzhen, China, Mar. 31-4, 2008, 8 pages.

\* cited by examiner

US 10,143,007 B2

METHOD AND APPARATUS FOR SIGNALING THE RELEASE OF A PERSISTENT RESOURCE

CROSS REFERENCE TO RELATED APPLICATIONS

This application is a continuation of U.S. patent application Ser. No. 15/164,947 filed on May 26, 2016, which is a continuation of U.S. patent application Ser. No. 14/685,159 filed on Apr. 13, 2015, which issued as U.S. Pat. No. 9,379,871 on Jun. 28, 2016, which is a continuation of U.S. patent application Ser. No. 14/266,349 filed on Apr. 30, 2014, which issued as U.S. Pat. No. 9,031,030 on May 12, 2015, which is a continuation of U.S. patent application Ser. No. 13/410,988 filed on Mar. 2, 2012, which issued as U.S. Pat. No. 8,767,654 on Jul. 1, 2014, which is a continuation of U.S. patent application Ser. No. 12/405,573 filed on Mar. 17, 2009, which issued as U.S. Pat. No. 8,155,067 on Apr. 10, 2012, which claims the benefit of U.S. Provisional Application No. 61/038,921 filed Mar. 24, 2008, the contents of each of which are incorporated by reference herein.

TECHNICAL FIELD

This application is related to wireless communications.

BACKGROUND

The basis for uplink (UL) and downlink (DL) scheduling is dynamic scheduling. In a long term evolution (LTE) wireless communication system, scheduling information is transmitted during transmission timing intervals (TTIs) to a wireless transmit/receive unit (WTRU) via a physical downlink control channel (PDCCH). It has been agreed by radio access network (RAN) working groups (i.e., RAN2) to support semi-persistent scheduling for the DL and the UL in LTE. For semi-persistently scheduled WTRUs in a TTI, a DL/UL grant does not need to be sent for initial data transmission. The only exception is when an evolved Node-B (eNB) wants to override the persistent resource assignment, which by definition should be infrequent. Otherwise, the sole purpose of a DL/UL persistent resource assignment is lost. As an optimization for voice over Internet protocol (VoIP), persistent scheduling is used for both DL and UL, where the resource for the initial transmissions is persistently allocated and the resources for the hybrid automatic repeat request (HARQ) retransmissions is dynamically allocated.

Persistent resource scheduling is configured and controlled, (e.g., turned on and off), by radio resource control (RRC) signaling. For instance, persistent resource scheduling may be controlled based on the periodicity of a resource allocation. HARQ processes that are used for persistent scheduling are provided using RRC signaling.

The exact timing, resources, and transport format parameters used for a persistent DL assignment are sent on a layer 1 (L1)/layer 2 (L2) control channel as a normal DL assignment. For example, an HARQ process identification (ID) may be used to indicate that the assignment should be stored. If the persistent DL assignment is missed, which occurs when there is no acknowledgment or non-acknowledgment (NACK), then an evolved Node-B (eNB) resends the assignment.

For VoIP service, the release of semi-persistent resources in both the DL and UL is important. Both explicit resource release and implicit resource release have been previously discussed, but there has yet to be a decision made as to the implementation of these features.

Furthermore, there is a need to clarify potential new signalings to support the release of a persistent resource using both explicit and implicit methods, procedures for either explicit or implicit persistent resource release, a failure case handling when persistent resource release signaling is lost or corrupted, new signaling for the activation of the persistent resource, and new signalings for the reconfiguration of the persistent resource allocation.

There exists the need for new signalings and rules for the activation, deactivation, reconfiguration, and release of UL and DL persistent resources in LTE systems.

SUMMARY OF THE INVENTION

A method and apparatus for signaling the release of a persistent resource in LTE are disclosed. An indication of the release of a DL persistent resource is received by a WTRU from an eNB via a PDCCH. A positive acknowledgement (ACK) is transmitted by the WTRU which denotes that the indication has been received. A PDCCH signaling or a medium access control (MAC) control element (CE) may be used by the eNB to signal the indication. At least one bit may be added to contents of the PDCCH to signal whether the PDCCH is for DL or UL persistent or dynamic resource allocation. The DL or UL persistent resource is then released and an indication that the DL or UL persistent resource has been released is transmitted.

BRIEF DESCRIPTION OF THE DRAWINGS

A more detailed understanding may be had from the following description, given by way of example in conjunction with the accompanying drawing wherein.

DETAILED DESCRIPTION

Figure 1:
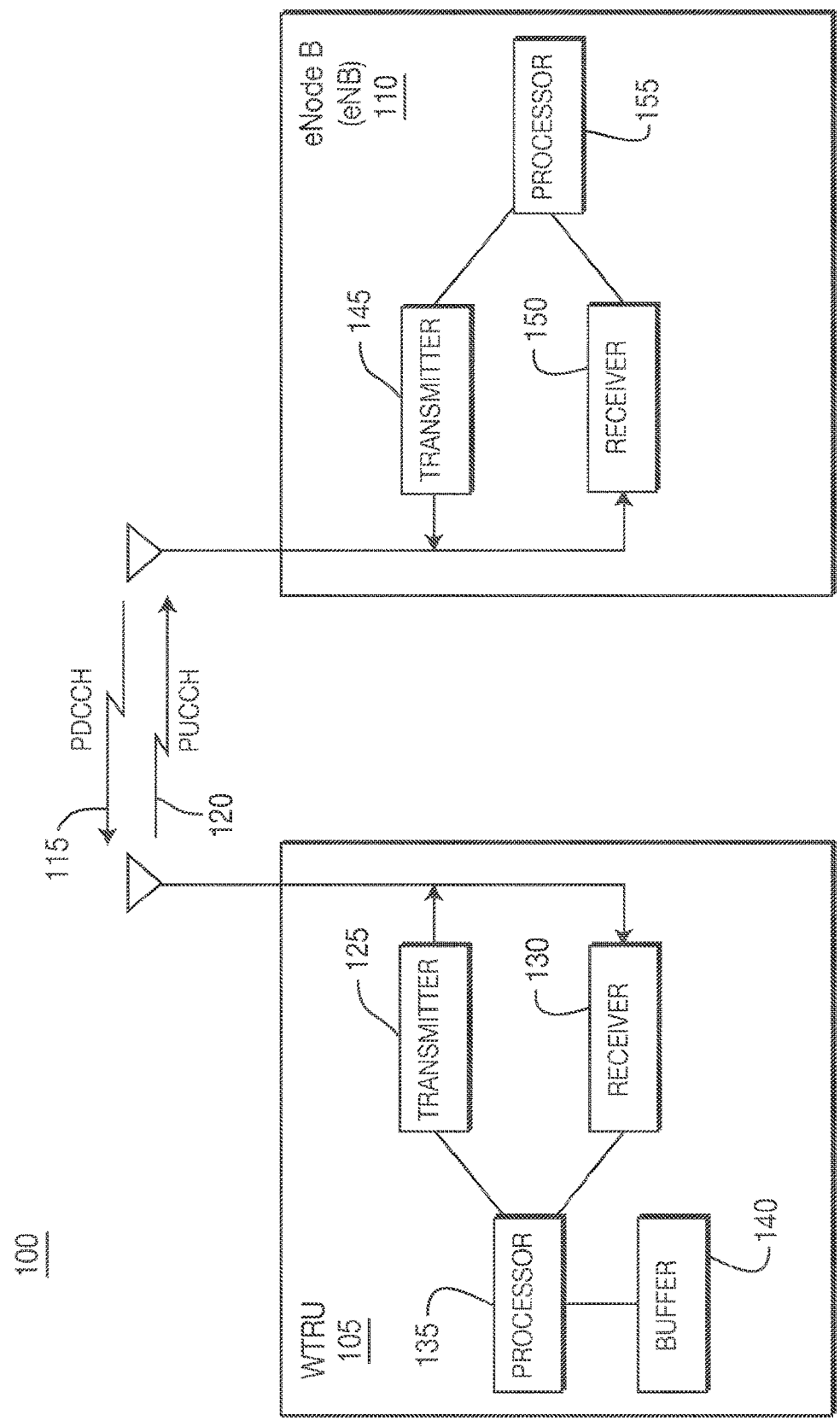
FIG. 1 shows a wireless communication system that is configured to signal the release of a persistent resource.

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment.

When referred to hereafter, the terminology "evolved Node-B (eNB)" includes but is not limited to a base station, a site controller, an access point (AP), or any other type of interfacing device capable of operating in a wireless environment.

FIG. 1 shows a wireless communication system 100 including a WTRU 105 and an eNB 110, which communicate over a physical downlink control channel (PDCCH) 115 and a physical uplink control channel (PUCCH) 120. The WTRU 105 includes a transmitter 125, a receiver 130, a processor 135 and a buffer 140. The eNB 110 includes a transmitter 145, a receiver 150 and a processor 155.

An indication of the release of a DL persistent resource is transmitted by the transmitter 145 in the eNB 110, and is received by the receiver 130 of the WTRU 105 via the PDCCH 115. The transmitter 125 in the WTRU 105 transmits an ACK to the ENB 110 which denotes that the indication has been received. The buffer 140 is used to store a DL assignment and DL transmitted data. A PDCCH or a MAC CE may be used by the eNB 110 to signal the indication. At least one bit may be added to contents of the PDCCH to signal whether the PDCCH is for DL persistent or dynamic resource allocation. The DL persistent resource is then released and an indication that the DL persistent resource has been released is transmitted by the transmitter 125 in the WTRU 105.

Explicit DL Persistent Resource Release

A method for signaling the release of a DL persistent resource using explicit signaling is disclosed. When explicit signaling is used to signal the release of a DL persistent resource from the eNB 110 to the WTRU 105, as shown in FIG. 1, either a PDCCH or a MAC CE may be used to signal the release of the DL persistent resource.

If a PDCCH 115 is used for explicit signaling, then one bit is added in the PDCCH 115 to signal whether the PDCCH 115 is for DL persistent or dynamic resource allocation. The one bit added to the PDCCH 115 may also signal the WTRU 105 to use separate cell radio network temporary identifiers (C-RNTIs), or to use a reserved value of some other field, such as a transmit power control (TPC) field.

Then, the WTRU 105 transmits an ACK/NACK to the eNB 110 to confirm the receipt of the PDCCH release signaling. Alternatively, after the WTRU 105 releases the DL persistent resource, the WTRU 105 transmits an indication to the eNB 110 to confirm the successful release of the DL persistent resource. With respect to the release of an UL persistent resource, the eNB 110 implicitly confirms the resource release by a loss of detection of the previously allocated resource.

A field on a PDCCH not used for persistent allocation may be used to indicate the release of DL or UL persistent resource. For example, two bits in a TPC field may be used, in which "00" indicates the release of a DL persistent resource, and two bits "01" in the TPC field may be used to indicate the release of a UL persistent resource.

A special MAC CE may be used to signal the release of a DL and UL persistent resource. For example, the two bits "00" in a MAC CE may indicate the explicit release of the DL persistent resource, and the two bits "01" may indicate the explicit release of the UL persistent resource. The number of bits in the MAC CE may vary, and a different digit permutation may be predefined for DL and UL persistent resource release.

If the WTRU 105 does not successfully receive the PDCCH or blind detection does not indicate any new DL voice packets in preconfigured TTIs for M times, then the WTRU 105 may release the DL persistent resource. The TTIs are used for persistent reception. This method may be characterized as a WTRU implicit resource release. Depending on whether the WTRU 105 can still receive DL dynamic traffic, the WTRU 105 should follow the rules to enter either a long or short discontinuous reception (DRX) cycle. After release of the DL persistent resource, it is optional whether the WTRU 105 transmits an indication to eNB 110, informing the eNB 110 of the autonomous release of the DL persistent resource. The indication may be transmitted using the next available periodic PUCCH, or through a new UL MAC CE.

Alternatively, when the WTRU 105 receives a first DL system identification number (SID) from the eNB 110 after the WTRU 105 entered a talk-spurt duration state, the WTRU 105 releases the DL persistent resource because the WTRU 105 determines that a talk-spurt duration state is finished. The WTRU 105 may then optionally transmit an indication to the eNB 110, indicating the release of the DL persistent resource.

Implicit DL Persistent Resource Release

A method for signaling the release of a DL persistent resource using implicit signaling is disclosed. The rules for the WTRU's implicit release of the DL persistent resource is similar to the failure handling when an explicit DL persistent resource signal is not received. However, there are differences in the WTRU rules for handling an implicit DL persistent resource release.

If the WTRU 105 does not successfully receive the PDCCH 115, and/or blind detection does not indicate any new DL voice packets in the preconfigured TTIs for M times, then the WTRU 105 may release the DL persistent resource. Depending on whether the WTRU 105 can still receive DL/UL dynamic traffic, the WTRU 105 should follow the rules to enter either long or short DRX cycle. When the WTRU 105 changes from a long DRX cycle to a short DRX cycle, or changes from a short DRX cycle to a long DRX cycle, then the WTRU 105 should report the change to the eNB 110 within the on-duration (or active time) of a new DRX cycle so that the eNB 110 knows the change of WTRU DRX cycle and avoids transmitting DL signaling in a wrong cycle's on-duration.

After the implicit release of the DL persistent resource, the WTRU 105 may then optionally transmit an indication to eNB 110 indicating the autonomous release of the DL persistent resource. This indication confirms the release of the DL persistent resource. The indication may be transmitted using the next available periodic PUCCH or through a new UL MAC CE.

Alternatively, when the WTRU 105 receives a first DL SID from the eNB 110 after the WTRU's talk-spurt duration, the WTRU 105 releases the DL persistent resource and enters a silent period because the WTRU 105 determines that a talk-spurt duration state is finished. The WTRU 105 may then optionally transmit an indication to the eNB 110 indicating the release of the DL persistent resource. The indication may be transmitted using the next available periodic PUCCH, or through a new UL MAC CE.

Explicit UL Persistent Resource Release

A method for signaling the release of an UL persistent resource using explicit signaling is disclosed.

After the WTRU 105 transmits an empty buffer (or padding) buffer status report (BSR) to the eNB 110 which indicates that there is no UL data for the WTRU 105 to transmit to the eNB 110, an indication of the explicit release of an UL persistent resource is transmitted from the eNB 110 using the PDCCH. The transmission of the indication of the explicit UL persistent resource release may be generated multiple times to decrease the probability of unsuccessful reception at the WTRU 105. The WTRU 105 may optionally provide feedback with an ACK/NACK. The transmission of the indication of the explicit UL persistent resource release may be piggybacked or multiplexed with other MAC PDUs. The indication of the explicit UL persistent resource release may be transmitted using the next available PDCCH or through a new DL MAC CE.

After the UL persistent resource is successfully received by the WTRU 105, the WTRU 105 may then transmit an indication to eNB 110 to acknowledge the release of the UL persistent resource.

Alternatively, confirmation of the release of the UL persistent resource is accomplished implicitly when the eNB 110 fails to detect subsequent UL transmissions on the UL persistent resource.

When the explicit UL persistent resource release signal is transmitted from the eNB 110 to the WTRU 105, there may be failure cases in which the indication is lost or in error. To handle the failure cases, the following methods are disclosed.

If the eNB 110 does not receive a NACK from the WTRU 105 after transmitting the explicit release of the UL persistent resource signal, then the eNB 10 transmits the explicit release of the UL persistent resource signal again until a maximum number of retransmissions is reached. At the expected subframe when the WTRU 105 should receive the explicit release of the UL persistent resource signal from the eNB 110, after the WTRU 105 transmits the empty BSR, if the WTRU 105 does not receive any feedback from the eNB 110, then the WTRU 105 releases the UL persistent resource autonomously if the WTRU 105 does not have any new UL VoIP packets in the buffer after N TTIs.

Alternatively, the WTRU 105 immediately releases the UL persistent resource when the WTRU 105 does not receive any feedback from the eNB 110 after transmitting the empty BSR.

Alternatively, if the WTRU 105 transmits the empty BSR and does not receive an explicit release of the UL persistent resource signal from the eNB 110, then the WTRU 105 does not release the UL persistent resource until there is an UL SID available. Then, the WTRU 105 sends a scheduling request (SR) for SID transmission to the eNB 110, enabling the eNB 110 to determine that the WTRU 105 transitioned from a talk-spurt duration state to a silent period. As a result, the UL persistent resource is already autonomously release by the WTRU 105.

Alternatively, after the WTRU 105 releases the UL persistent resource and enters a new DRX cycle, (depending on the DL/UL dynamic traffic), the WTRU 105 transmits an UL indication to the eNB 110, wherein the indication denotes the release of UL persistent resource and the start of the new DRX cycle to synchronize the WTRU 105 with the eNB 110. The UL indication may be transmitted in the next PUCCH using physical (PHY) signaling. Alternatively, the UL indication may be in the physical uplink shared channel (PUSCH) as a new MAC CE or radio resource control (RRC) signaling. The new MAC CE indicates the implicit release of UL persistent resource by the WTRU 105.

Implicit UL Persistent Resource Release

A method for signaling the release of an UL persistent resource using implicit signaling is disclosed.

After the WTRU 105 detects that there is no more UL voice data packet, the WTRU 105 transmits an empty buffer (or padding) BSR, a PHY indication in PUCCH, or a MAC CE to the eNB 110 indicating the status change and immediately releases the UL persistent resource implicitly. The WTRU 105 transmits the empty buffer (or padding) BSR on N consecutive semi-persistent subframes.

In an alternative embodiment, the WTRU 105 transmits the empty (or padding) BSR only once and waits for N−1 consecutive semi-persistent subframes to determine whether there is new voice data available in a buffer. If there is no new voice data in the buffer during this period, then the WTRU 105 releases the UL persistent resource.

Alternatively, the WTRU 105 releases the UL persistent resource when the WTRU 105 has a first UL SID packet to transmit since entering the talk-spurt state. The WTRU 105 may release the UL persistent resource when the WTRU 105 has the SID packet in the buffer, after the WTRU 105 sends the SR, or after the WTRU 105 transmits the first UL SID packet.

Alternatively, after the WTRU 105 releases the UL persistent resource and enters a new DRX cycle, (depending on the DL/UL dynamic traffic), the WTRU 105 transmits an UL indication to the eNB 110, wherein the indication denotes the release of UL persistent resource and the start of the new DRX cycle to synchronize the WTRU 105 with the eNB 110. The UL indication may be transmitted in the next PUCCH using PHY signaling. Alternatively, the UL indication may be in the PUCCH as a new MAC CE or radio resource control (RRC) signaling. The new MAC CE indicates the implicit release of UL persistent resource by the WTRU 105.

Activation and Reconfiguration Signaling for Persistent Resource

A method for signaling the activation and reconfiguration of a persistent resource using implicit signaling is disclosed. A new field is added to the PDCCH 115 to indicate the start time for either DL or UL persistent resource allocation. The new field may be in the form of a starting system frame number (SFN). Alternatively, either a DL or UL persistent resource allocation may be triggered, without using the start time, when a WTRU 105 successfully decodes the PDCCH 115 for persistent allocation. The DL or UL persistent resource allocation is triggered immediately at a next subframe or N subframes, after successfully decoding the PDCCH 115 for persistent allocation.

For reconfiguration of both the UL and DL persistent resource, either the PDCCH 115 or the MAC CE may be used, in addition to using RRC signaling. When using the PDCCH 115 and/or MAC CE to reconfigure a persistence resource, the following may be used to reconfigure an UL or DL persistent resource.

1) If only the radio resource and transport format need to be reconfigured, then the PDCCH 115 may be used to include the new resource and transport format (TF) information without significantly changing the PDCCH 115 content.

2) If information such as periodicity and/or at least one new HARQ process needs to be configured with the resource and transport format, then both the PDCCH 115 and MAC CE may be used to reconfigure the new resource and TF.

3) If only periodicity and/or at least one new HARQ process needs to be reconfigured, then only the MAC CE may be used for the reconfiguration of the persistent resource.

4) A new field is added to the PDCCH 115 for the configuration or reconfiguration of the persistent resource, wherein the new field includes parameters for periodicity and at least one HARQ process. The new field permits the PDCCH 115 to be used for the reconfiguration of all necessary parameters including periodicity, at least one HARQ process, exact start timing, resources, and transport format.

5) A MAC CE is used for the reconfiguration of all necessary parameters including periodicity, at least one HARQ process, exact start timing, resources, and transport format.

Although features and elements are described above in particular combinations, each feature or element can be used alone without the other features and elements or in various combinations with or without other features and elements.

The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed:

1. A wireless transmit/receive unit (WTRU) comprising a processor configured to:
   receive a first physical downlink control channel (PDCCH) transmission, wherein the first PDCCH transmission indicates a release of a downlink persistent resource;
   transmit a positive acknowledgement based on receiving the first PDCCH transmission that indicates the release of the downlink persistent resource;
   receive a second PDCCH transmission, wherein the second PDCCH transmission indicates a release of an uplink persistent resource; and
   transmit a medium access control (MAC) control element (CE) based on receiving the second PDCCH transmission that indicates the release of the uplink persistent resource.

2. The WTRU as in claim 1, wherein the MAC CE indicates that the WTRU has released the uplink persistent resource.

3. The WTRU as in claim 1, wherein the MAC CE is transmitted on a physical uplink shared channel (PUSCH).

4. The WTRU as in claim 1, wherein the processor is further configured to:
   release the downlink persistent resource based on receiving the first PDCCH transmission; and
   release the uplink persistent resource based on receiving the second PDCCH transmission.

5. The WTRU as in claim 1, wherein a third PDCCH transmission is received that activates or reconfigures at least one of the downlink persistent resource or the uplink persistent resource.

6. A method implemented by a wireless transmit/receive unit (WTRU), the method comprising:
   the WTRU receiving a first physical downlink control channel (PDCCH) transmission, wherein the first PDCCH transmission indicates a release of a downlink persistent resource;
   the WTRU transmitting a positive acknowledgement based on receiving the first PDCCH transmission that indicates the release of the downlink persistent resource;
   the WTRU receiving a second PDCCH transmission, wherein the second PDCCH transmission indicates a release of an uplink persistent resource; and
   the WTRU transmitting a medium access control (MAC) control element (CE) based on receiving the second PDCCH transmission that indicates the release of the uplink persistent resource.

7. The method as in claim 6, wherein the MAC CE indicates that the WTRU has released the uplink persistent resource.

8. The method as in claim 6, wherein the MAC CE is transmitted on a physical uplink shared channel (PUSCH).

9. The method as in claim 6, further comprising:
   the WTRU releasing the downlink persistent resource based on receiving the first PDCCH transmission; and
   the WTRU releasing the uplink persistent resource based on receiving the second PDCCH transmission.

10. The method as in claim 6, wherein a third PDCCH transmission is received that activates or reconfigures at least one of the downlink persistent resource or the uplink persistent resource.

11. A base station comprising a processor configured to:
    send a first physical downlink control channel (PDCCH) transmission, wherein the first PDCCH transmission indicates a release of a downlink persistent resource assigned to the WTRU;
    receive a positive acknowledgement from the WTRU that that indicates the release of the downlink persistent resource;
    send a second PDCCH transmission, wherein the second PDCCH transmission indicates a release of an uplink persistent resource assigned to the WTRU; and
    receive a medium access control (MAC) control element (CE) from the WTRU that indicates the release of the uplink persistent resource.

12. The base station as in claim 11, wherein the MAC CE indicates that the WTRU has released the uplink persistent resource.

13. The base station as in claim 11, wherein the MAC CE is received on a physical uplink shared channel (PUSCH).

14. The base station as in claim 11, wherein a third PDCCH transmission is sent that activates or reconfigures at least one of the downlink persistent resource or the uplink persistent resource.

* * * * *